US012749847B2

(12) United States Patent
Hamai et al.

(10) Patent No.: US 12,749,847 B2
(45) Date of Patent: Sep. 29, 2026

(54) CONNECTOR INCLUDING WIRE INSERTION PATH FORMED BY FIRST GROOVE AND SECOND GROOVE AND PROTRUSION IN FIRST GROOVE

(71) Applicant: YAZAKI CORPORATION, Tokyo (JP)

(72) Inventors: Tsuyoshi Hamai, Makinohara (JP); Takatoshi Suzuki, Makinohara (JP); Masakazu Nagaoka, Makinohara (JP); Takuya Ohashi, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 338 days.

(21) Appl. No.: 18/592,397

(22) Filed: Feb. 29, 2024

(65) Prior Publication Data

US 2024/0204451 A1 Jun. 20, 2024

Related U.S. Application Data

(63) Continuation of application No. PCT/JP2022/044678, filed on Dec. 5, 2022.

(30) Foreign Application Priority Data

Dec. 28, 2021 (JP) ................................ 2021-214458

(51) Int. Cl.
*H01R 13/58* (2006.01)
*H01R 13/516* (2006.01)
*H01R 13/506* (2006.01)

(52) U.S. Cl.
CPC ......... *H01R 13/582* (2013.01); *H01R 13/516* (2013.01); *H01R 13/506* (2013.01); *H01R 2201/26* (2013.01)

(58) Field of Classification Search
CPC ......................... H01R 13/5825; H01R 13/516; H01R 13/506; H01R 13/582; H01R 13/533

(Continued)

(56) References Cited

U.S. PATENT DOCUMENTS 5,855,493 A * 1/1999 Shelly .................. H01R 13/516 439/465
6,250,952 B1 * 6/2001 Shiga ...................... F42C 19/06 439/466

(Continued)

FOREIGN PATENT DOCUMENTS

CN 112134063 A * 12/2020 ......... H01R 13/6585
JP 2007005132 A * 1/2007

(Continued)

*Primary Examiner* — Marcus E Harcum
(74) *Attorney, Agent, or Firm* — KENEALY VAIDYA LLP

(57) ABSTRACT

A connector includes a terminal fitting physically and electrically connected to a terminal of an electric wire to form a terminal-equipped electric wire; and a housing configured to accommodate a plurality of the terminal-equipped electric wires, hold two adjacent electric wires side by side in a direction orthogonal to an axial direction by an electric wire holding portion, and draw out each of the electric wires from the electric wire holding portion while keeping an arrangement state. The electric wire holding portion has an electric wire insertion path formed by a first and a second grooves joined in an assembly direction of the first holding portion and the second holding portion orthogonal to the axial direction. The two adjacent electric wire insertion paths are offset from each other in the direction orthogonal to the axial direction and the assembly direction, and are offset from each other in the assembling direction.

16 Claims, 8 Drawing Sheets

(58) Field of Classification Search
USPC .................................................. 439/465, 466
See application file for complete search history.

(56) References Cited

U.S. PATENT DOCUMENTS

| | | | | |
|---|---|---|---|---|
| 6,280,234 | B1 * | 8/2001 | Yamamoto | H01R 13/582 439/456 |
| 6,485,325 | B1 * | 11/2002 | Fukuda | H01R 13/5208 439/465 |
| 6,485,333 | B1 * | 11/2002 | Shinchi | H01R 43/005 439/465 |
| 7,753,076 | B2 * | 7/2010 | Mita | H01R 24/66 439/465 |
| 8,979,574 | B2 * | 3/2015 | Daily, Jr. | H01R 4/2433 439/676 |
| 9,692,171 | B2 * | 6/2017 | Suzuki | H01R 13/5205 |
| 9,893,462 | B2 * | 2/2018 | Hashimoto | H01R 11/11 |
| 10,355,372 | B2 * | 7/2019 | Iizuka | H01R 13/405 |
| 10,418,743 | B2 * | 9/2019 | Mori | H01R 13/512 |
| 10,651,604 | B2 * | 5/2020 | Tsukamoto | H01R 31/08 |
| 10,700,463 | B2 * | 6/2020 | Yanagibashi | H01R 13/506 |
| 10,811,817 | B1 * | 10/2020 | Peterson | H01R 13/502 |
| 11,228,141 | B2 * | 1/2022 | Miyamura | H01R 13/629 |
| 2002/0009932 | A1 * | 1/2002 | Inaba | H01R 13/501 439/701 |
| 2003/0181092 | A1 * | 9/2003 | Negishi | H01R 13/64 439/404 |
| 2006/0086900 | A1 * | 4/2006 | Nakamura | H01R 13/6633 250/239 |
| 2008/0176423 | A1 * | 7/2008 | Fujimaki | H01R 13/6658 439/76.1 |
| 2012/0094538 | A1 * | 4/2012 | Ikeda | H01R 13/5841 439/625 |
| 2014/0141637 | A1 * | 5/2014 | Miyakawa | H01R 13/639 439/246 |
| 2015/0147918 | A1 * | 5/2015 | Matsuda | B60L 50/50 439/694 |
| 2015/0280359 | A1 * | 10/2015 | Nagy | H01R 13/582 439/470 |
| 2017/0170599 | A1 * | 6/2017 | Zhou | H01R 13/533 |
| 2019/0140384 | A1 * | 5/2019 | Miyoshi | H01R 13/506 |
| 2019/0168694 | A1 * | 6/2019 | Kato | H01R 13/631 |
| 2019/0296485 | A1 * | 9/2019 | Masuda | H01R 13/639 |
| 2020/0212613 | A1 * | 7/2020 | Hirakawa | H01R 13/5208 |
| 2022/0384983 | A1 * | 12/2022 | Iwamoto | H01R 13/4362 |
| 2023/0163519 | A1 * | 5/2023 | Matsuoka | H01R 13/5221 439/278 |
| 2023/0299536 | A1 * | 9/2023 | Wi | H01R 13/514 439/655 |
| 2024/0120678 | A1 * | 4/2024 | Miyamura | H01R 13/424 |

FOREIGN PATENT DOCUMENTS

| | | | | | |
|---|---|---|---|---|---|
| JP | 2007287464 | A | * | 11/2007 | |
| JP | 2013110025 | A | * | 6/2013 | |
| JP | 2015011945 | A | * | 1/2015 | |
| JP | 2017-73212 | A | | 4/2017 | |
| JP | 2017152105 | A | * | 8/2017 | |
| KR | 20140041166 | A | * | 4/2014 | H01R 13/506 |

* cited by examiner

CONNECTOR INCLUDING WIRE INSERTION PATH FORMED BY FIRST GROOVE AND SECOND GROOVE AND PROTRUSION IN FIRST GROOVE

CROSS-REFERENCE TO RELATED APPLICATION

This application is a continuation application of International Application No. PCT/JP2022/044678 filed on Dec. 5, 2022 which claims the benefit of priority from Japanese Patent Application No. 2021-214458 filed on Dec. 28, 2021 and designating the U.S., the entire contents of which are incorporated herein by reference.

BACKGROUND OF THE INVENTION

1. Field of the Invention

The present invention relates to a connector.

2. Description of the Related Art

Conventionally, there has been known a connector in which electric wires of a plurality of sets of terminal-equipped electric wires are arranged in a direction orthogonal to an axial direction of the electric wires in a housing, and the electric wires are drawn out of the housing in this arrangement state. The connector is provided with an electric wire holding portion that holds each electric wire in an arranged state by two holding portions assembled to each other. A semicircular columnar groove for each electric wire is formed in each of the two holding portions. In the electric wire holding portion, the groove of one holding portion and the groove of the other holding portion are paired, and the electric wire is held in a columnar electric wire insertion path formed by the pair of grooves. This type of connector is disclosed in, for example, Japanese Patent Application Laid-open No. 2017-73212.

Meanwhile, in the connector, downsizing of the body may be required in a direction (that is, an arrangement direction of the respective electric wires) orthogonal to the axial direction of each electric wire and a joining direction of the pair of grooves. For example, in the conventional connector, a plate-like partition wall between the two adjacent grooves is thinned in both the holding portions, and an interval between the two adjacent wires is narrowed, so that the size in the arrangement direction of the respective wires can be downsized. However, since there is a limit to thinning the partition wall of the conventional connector from the viewpoint of strength and the like, it is difficult to meet a demand for further miniaturization of the size.

SUMMARY OF THE INVENTION

Therefore, an object of the present invention is to provide a connector suitable for size reduction of a body.

A connector according to one aspect of the present invention includes a terminal fitting physically and electrically connected to a terminal of an electric wire to form a terminal-equipped electric wire; and a housing configured to accommodate a plurality of the terminal-equipped electric wires, hold two adjacent electric wires side by side in a direction orthogonal to an axial direction thereof by an electric wire holding portion, and draw out each of the electric wires from the electric wire holding portion while keeping an arrangement state thereof, wherein the housing includes a housing body that accommodates the terminal-equipped electric wire from an insertion port, and a cover member that is assembled to the housing body to block the insertion port, and forms the electric wire holding portion by coupling a first holding portion of the housing body and a second holding portion of the cover member at an assembly completion position of the housing body and the cover member, the electric wire holding portion includes an electric wire insertion path which is a path for each electric wire in which the electric wire is inserted and held in the axial direction over the inside and outside of the housing, and formed by a first groove and a second groove joined in an assembling direction of the first holding portion and the second holding portion orthogonal to the axial direction, the two adjacent electric wire insertion paths are offset from each other in a direction orthogonal to the axial direction and the assembling direction, and are offset from each other in the assembling direction, the first groove is formed as an electric wire accommodation groove that accommodates the electric wire from an electric wire insertion port opened in the assembling direction, and the second groove has a smaller volume than that of the first groove and is formed as a cover groove that covers the electric wire insertion port.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment of a connector according to the present invention will be described in detail with reference to the drawings. Note that the present invention is not limited by the embodiment.

Embodiment

One embodiment of a connector according to the present invention will be described with reference to FIGS. 1 to 8.

Figure 1:
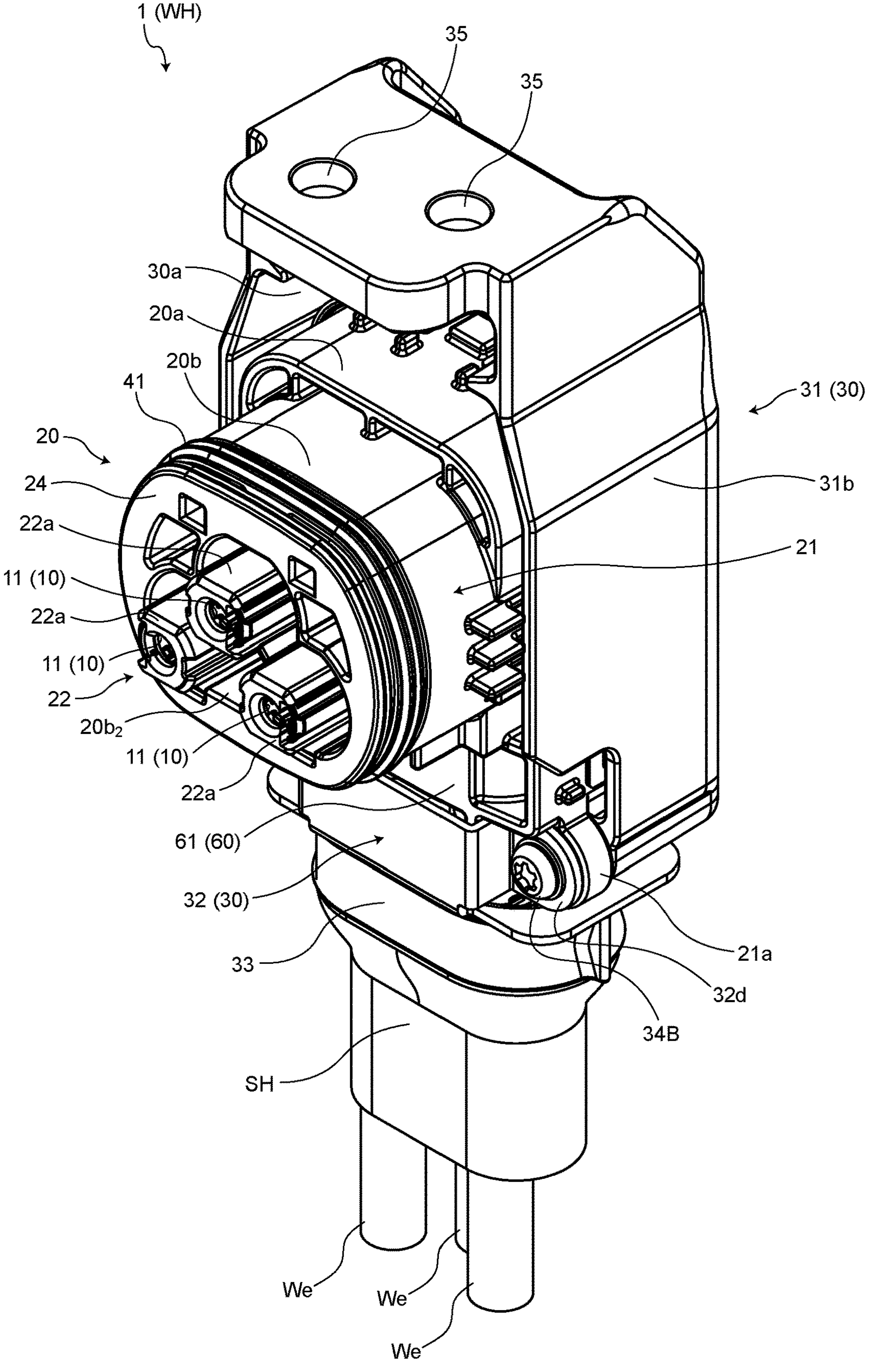
FIG. 1 is a perspective view illustrating a connector according to an embodiment.
Figure 2:
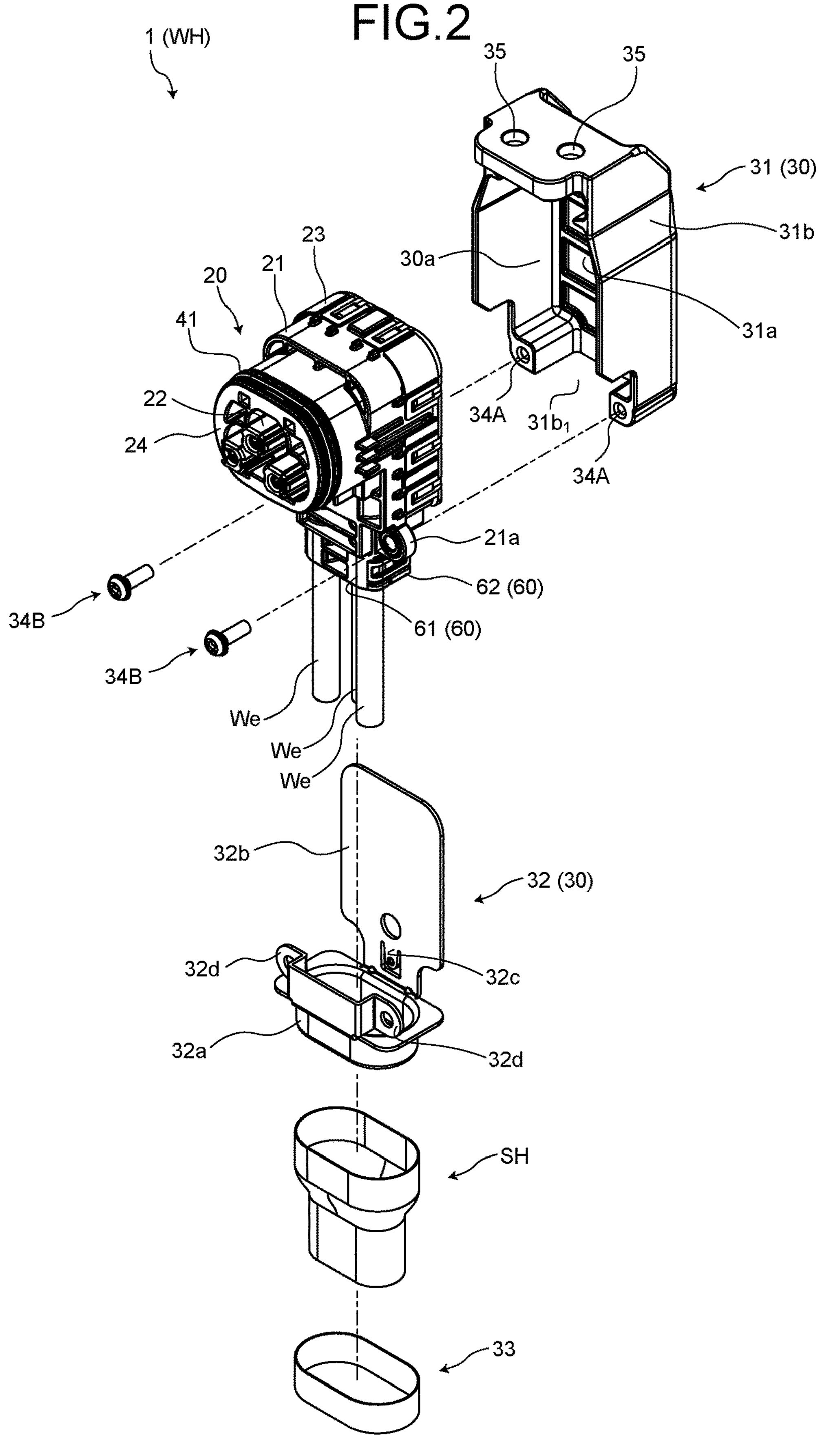
FIG. 2 is an exploded perspective view illustrating the connector with a shield shell removed according to the embodiment.
Figure 3:
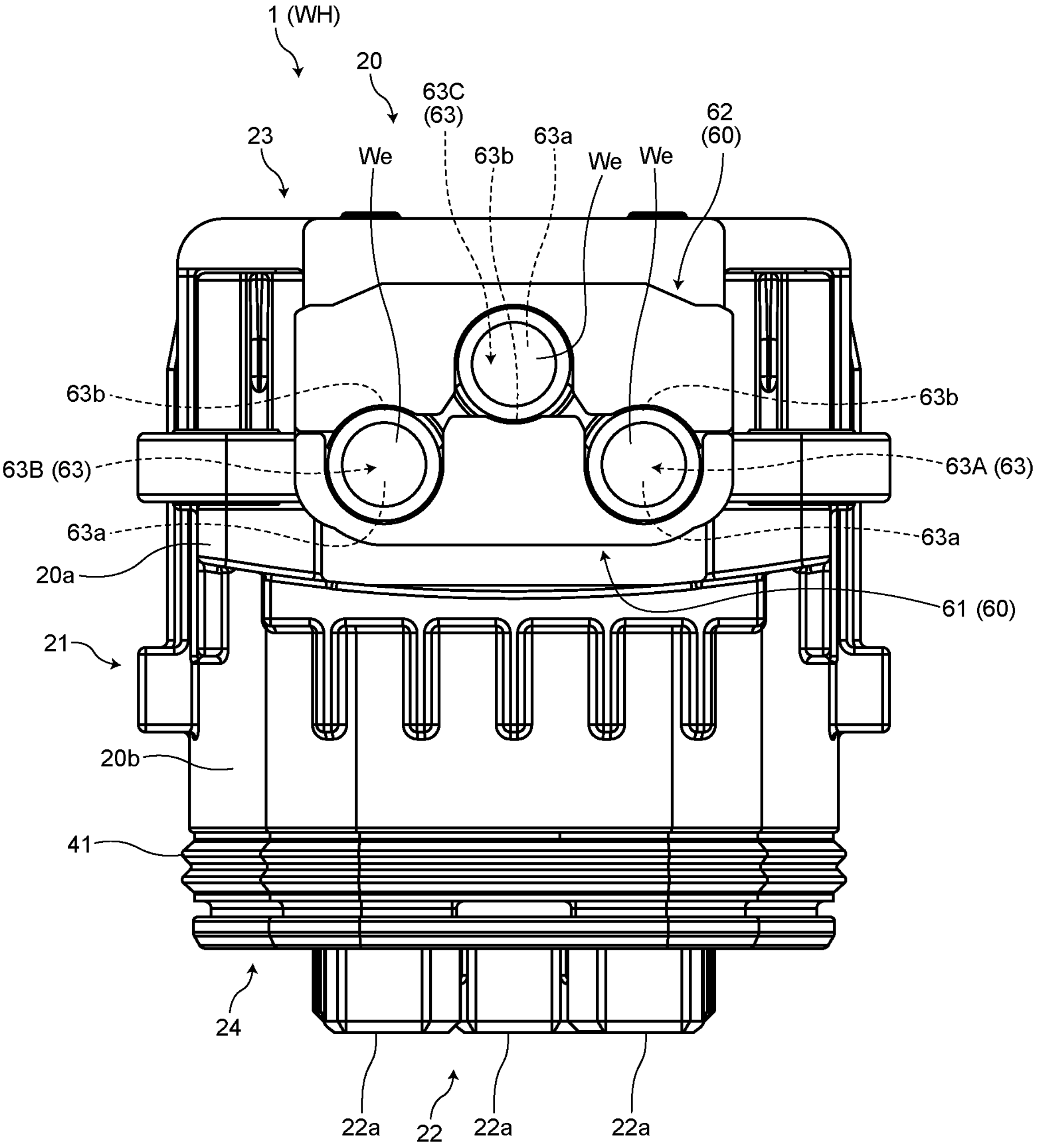
FIG. 3 is a plan view of the connector (excluding shield shell) as viewed from an electric wire outlet side according to an embodiment.

Reference numeral 1 in FIGS. 1 to 3 denotes a connector according to the present embodiment. The connector 1 is assembled to a terminal of an electric wire We, and configures a wire harness WH together with the electric wire We. The wire harness WH is disposed between a plurality of electric devices (not illustrated) mounted on a vehicle, and electrically connects the electric wire We to the electric devices through the connector 1, thereby electrically connecting the plurality of electric devices through the electric wire We. Here, in order to secure a shielding function of the electric devices, the wire harness WH also has a shielding function similarly to the electric device. Therefore, in the wire harness WH, a space between the plurality of connectors 1 in the electric wire We is covered from the outside with a shield material SH (FIG. 1) such as a cylindrical braid, and the connector 1 is configured as a so-called shield connector.

The connector 1 includes a terminal fitting 10 and an insulating housing 20 that accommodates an electric wire We and the terminal fitting 10 (FIG. 1). Further, the connector 1 includes a conductive shield shell 30 for reducing noise (FIG. 1).

The terminal fitting 10 is made of a conductive material such as metal. For example, the terminal fitting 10 is formed into a predetermined shape by press molding such as bending or cutting a metal plate as a base material.

Figure 4:
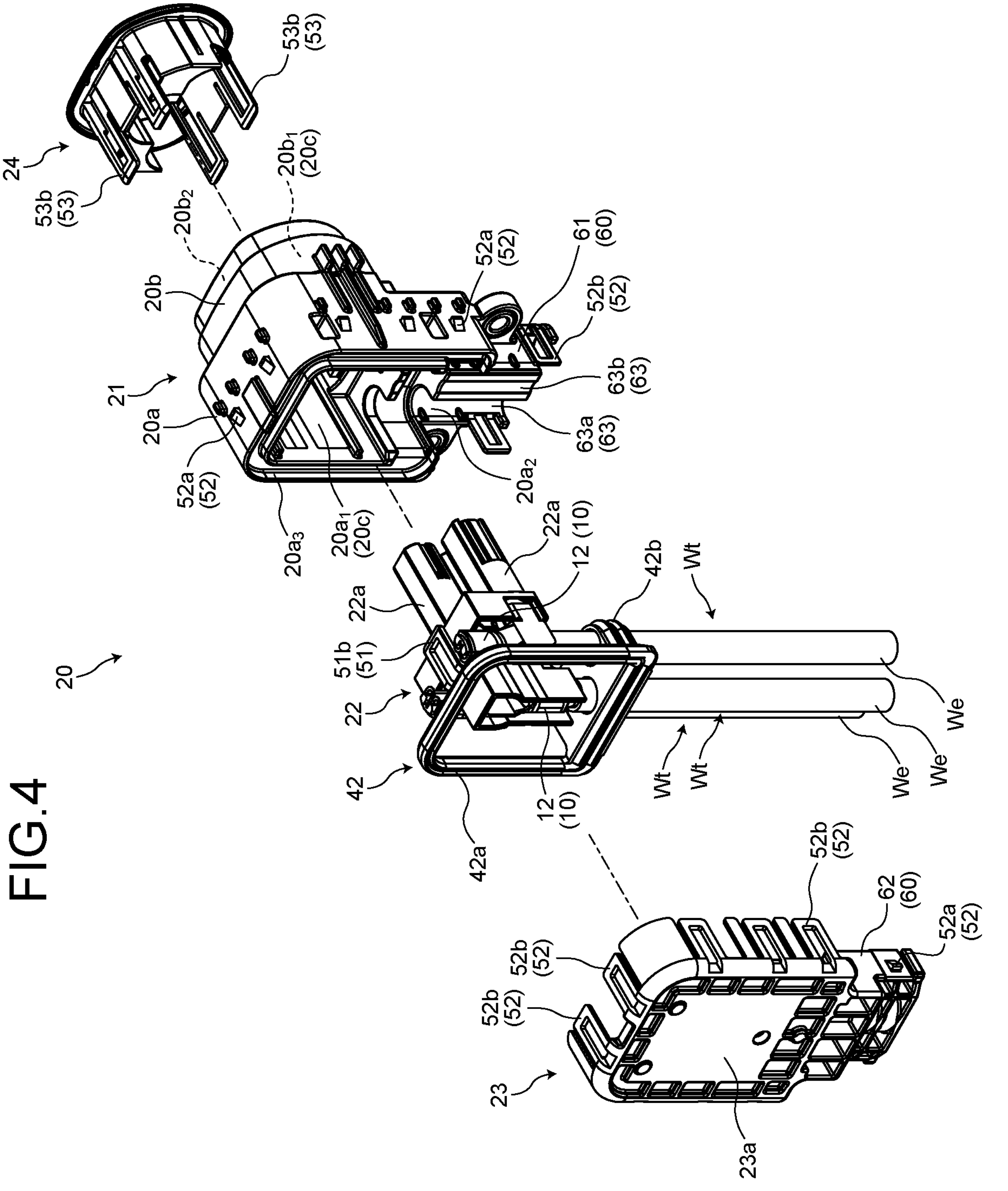
FIG. 4 is an exploded perspective view of a housing and illustrates the housing together with a terminal-equipped electric wire.
Figure 5:
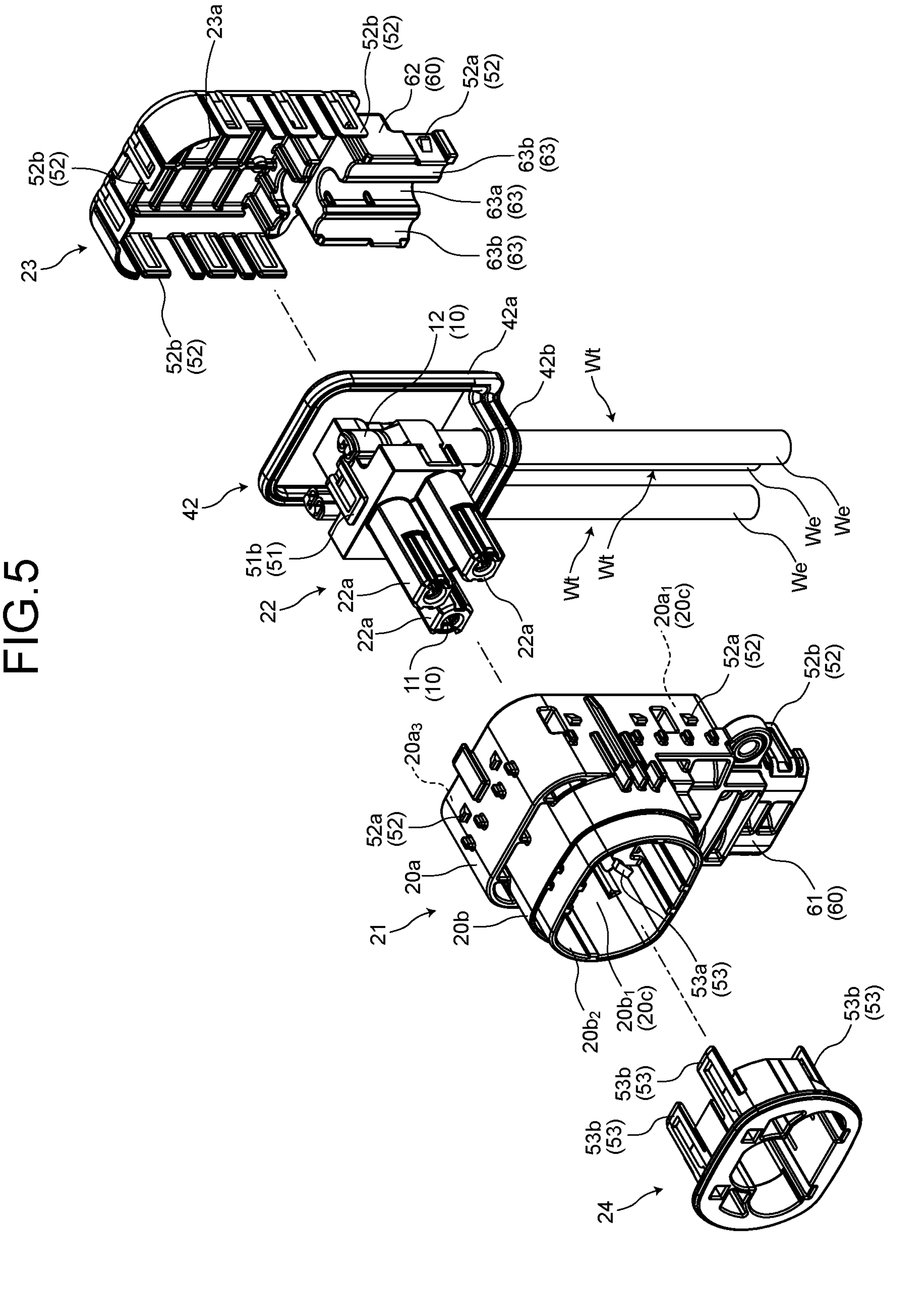
FIG. 5 is an exploded perspective view of the housing as viewed from another angle, and illustrates the housing together with the terminal-equipped electric wire.

The terminal fitting 10 is physically and electrically connected to a terminal of the electric wire We to form a terminal-equipped electric wire Wt (FIGS. 4 and 5). Then, the terminal fitting 10 is electrically connected to a device body in a metal housing of the electric device (not illustrated).

The terminal fitting 10 includes a terminal connection portion 11 to be electrically connected to a device body (FIGS. 1 and 5). The terminal fitting 10 is indirectly electrically connected to the device body by physically and electrically connecting the terminal connection portion 11 to a counterpart terminal fitting (not illustrated) of the electric device. The terminal connection portion 11 is physically and electrically connected to the counterpart terminal connection portion of the counterpart terminal fitting by being fitted and connected to the counterpart terminal connection portion along a fitting connection direction. In this example, the terminal connection portion 11 is formed in a cylindrical female terminal shape, and the counterpart terminal connection portion is formed in a shaft-like male terminal shape to be fitted into the terminal connection portion 11. A contact member (not illustrated) that is elastically deformed as the counterpart terminal connection portion is inserted is assembled inside the terminal connection portion 11. Here, the counterpart terminal connection portion is fitted into the terminal connection portion 11, and a connection direction with respect to the counterpart terminal connection portion as viewed from the terminal connection portion 11 is defined as a fitting connection direction.

In addition, the terminal fitting 10 includes an electric wire connection portion 12 to be physically and electrically connected to the terminal of the electric wire We (FIGS. 4 and 5). The electric wire connection portion 12 is physically and electrically connected to the electric wire We by, for example, crimping or welding an exposed core wire of an end of the electric wire We. The electric wire We is drawn out from the electric wire connection portion 12. In the terminal fitting 10, the terminal connection portion 11 and the electric wire connection portion 12 are formed in order to draw out the electric wire We in a direction orthogonal to a fitting connection direction of the terminal connection portion 11.

The connector 1 includes a plurality of terminal-equipped electric wires Wt. Here, three terminal-equipped electric wires Wt are provided (FIGS. 4 and 5). In the connector 1, the three terminal fittings 10 are arranged such that the fitting connection directions of all the terminal connection portions 11 coincide with the same direction, and the drawing directions of all the electric wires We coincide with the same direction to cause all the electric wires We to be placed in parallel.

The housing 20 is made of an insulating material such as a synthetic resin. A plurality of terminal-equipped electric wires Wt (here, three terminal-equipped electric wires Wt) are accommodated in the housing 20.

The housing 20 includes a first cylindrical portion 20*a* formed in a cylindrical shape, and a second cylindrical portion 20*b* having a cylindrical shape protruding from one end of the first cylindrical portion 20*a* in a cylindrical axis direction with a cylindrical axis direction being aligned with the cylindrical axis direction of the first cylindrical portion 20*a* (FIGS. 1 and 3 to 5). In addition, the housing 20 has a containment chamber (hereinafter, referred to as a "terminal containment chamber") 20*c* in which the terminal fitting 10 is accommodated (FIG. 4). In the housing 20, a space 20*a*1 inside the first cylindrical portion 20*a* and a space 20*b*1 inside the second cylindrical portion 20*b* communicate with each other. In the housing 20, the respective inner spaces 20*a*1 and 20*b*1 are used as a terminal containment chamber 20*c*. Here, the electric wire connection portion 12 is accommodated in the space 20*a*1 inside the first cylindrical portion 20*a*, and the terminal connection portion 11 is accommodated in the space 20*b*1 inside the second cylindrical portion 20*b*.

A terminal of the electric wire We is also accommodated in the space 20*a*1 inside the first cylindrical portion 20*a* together with the electric wire connection portion 12. In the first cylindrical portion 20*a*, a notch 20*a*2 for drawing out the electric wire We from the space 20*a*1 is formed (FIG. 4). The first cylindrical portion 20*a* illustrated here is formed in a rectangular cylindrical shape, and a notch 20*a*2 is provided on one side thereof.

In the space 20*b*1 inside the second cylindrical portion 20*b*, the terminal connection portion 11 is accommodated with a fitting connection direction aligned with a fitting connection direction to the counterpart terminal connection portion. In the space 20*b*1 inside the second cylindrical portion 20*b* illustrated here, the terminal connection portions 11 of the two terminal fittings 10 are accommodated side by side in a direction orthogonal to a cylindrical axis direction of the second cylindrical portion 20*b* (the fitting connection direction of the terminal connection portion 11) and a drawing direction of the electric wire We from the electric wire connection portion 12, and the terminal connection portion 11 of the remaining one terminal fitting 10 is accommodated at an interval in a direction opposite to the drawing direction of the electric wire We with respect to an intermediate position of the two terminal connection portions 11 (FIG. 1). That is, in the space 20*b*1 inside the second cylindrical portion 20*b*, the terminal connection portions 11 of the three terminal fittings 10 are accommodated side by side at apex positions of the triangles.

The housing 20 has a fitting portion to be fitted and connected to a through hole (not illustrated) of a housing of the electric device. In the housing 20, the second cylindrical portion 20*b* is used as the fitting portion (FIG. 1). The fitting portion (second cylindrical portion 20*b*) is inserted into and fitted into a through hole of the housing along the fitting connection direction in the same direction as the fitting connection direction of the terminal connection portion 11 with respect to the counterpart terminal connection portion. The fitting portion (second cylindrical portion 20*b*) is removed from the through hole of the housing along a removal direction opposite to the fitting connection direction. The fitting portion (second cylindrical portion 20*b*) is formed in a cylindrical shape in which an insertion and removal direction (insertion direction, insertion and removal direction) with respect to the through hole is a cylindrical axis direction. The fitting portion (second cylindrical portion 20*b*) illustrated here is formed in an elongated cylindrical shape whose cross section orthogonal to the insertion and removal direction is an elongated annular shape.

The connector 1 includes an annular seal member 41 that fills an annular gap between an outer peripheral surface of the fitting portion (second cylindrical portion 20*b*) and an inner peripheral surface of the through hole in the housing to achieve waterproof and dustproof therebetween (FIGS. 1 to 3). The seal member 41 is made of an elastic member such as synthetic rubber. Then, the seal member 41 is assembled to an outer peripheral surface of the fitting portion (second cylindrical portion 20*b*).

The housing 20 of the present embodiment includes a housing body 21 provided with the first cylindrical portion 20*a* and the second cylindrical portion 20*b* (FIGS. 1 to 5).

In the housing body 21, the terminal-equipped electric wire Wt is accommodated in a terminal containment chamber 20*c* from an opening (the opening is an opening at an end opposite to the fitting connection direction, and is hereinafter referred to as an "insertion port") 20*a*3 (FIGS. 2, 4, 5, and 7) at an end in the cylindrical axis direction of the first cylindrical portion 20*a*. In the housing body 21, an end portion of the terminal connection portion 11 on a fitting connection direction side protrudes from an opening (the opening of an end portion on the fitting connection direction side) 20*b*2 (FIGS. 1, 4, and 5) of an end portion of the fitting portion (second cylindrical portion 20*b*) in the cylindrical axis direction. The terminal fitting 10 is held in the terminal containment chamber 20*c*.

The housing 20 of the present embodiment includes a terminal holding member 22 that is accommodated in the terminal containment chamber 20*c* and holds the terminal fitting 10 in the terminal containment chamber 20*c* (FIGS. 1 to 5). The terminal holding member 22 is made of an insulating material such as synthetic resin. In the terminal holding member 22, a cylindrical terminal containment portion 22*a* that accommodates and holds the terminal connection portion 11 is provided for each terminal fitting 10 (FIGS. 1 and 3 to 5).

The terminal holding member 22 is held by the housing body 21 in the terminal containment chamber 20*c*. For example, the housing body 21 and the terminal holding member 22 are held between each other by a plurality of lock mechanisms 51 using claw portions or the like that hook each other (FIGS. 4 and 5). The lock mechanism 51 includes a claw-like first locking portion (not illustrated) and a second locking portion 51*b* that is locked to the first locking portion to hold the housing body 21 and the terminal holding member 22 at an assembly completion position. Here, the first locking portion is provided on the housing body 21, and the second locking portion 51*b* is provided on the terminal holding member 22.

In addition, the housing 20 of the present embodiment includes a holding portion (hereinafter, referred to as an "electric wire holding portion") 60 that guides and holds the electric wire We drawn out from the notch 20*a*2 of the first cylindrical portion 20*a* in the drawing direction (FIGS. 1 to 8). The electric wire holding portion 60 holds two adjacent electric wires We side by side in a direction orthogonal to the axial direction thereof. Further, the electric wire holding portion 60 draws out the respective electric wires We to the outside of the housing 20 in the arrangement state. The housing body 21 includes a first holding portion 61 that serves as one end of the electric wire holding portion 60 (FIGS. 1 to 6 and 8). The first holding portion 61 will be described in detail later.

In addition, the housing 20 of the present embodiment includes a cover member 23 that is assembled to the housing body 21 to block an insertion port 20*a*3 of the first cylindrical portion 20*a* (FIGS. 2 to 5). The cover member 23 is made of an insulating material such as synthetic resin.

The cover member 23 has a plate-like blockage portion 23*a* that blocks the insertion port 20*a*3 of the first cylindrical portion 20*a* (FIGS. 2, 4, and 5). The blockage portion 23*a* is formed in a rectangular plate shape so as to block a rectangular insertion port 20*a*3 of the first cylindrical portion 20*a*. The cover member 23 is assembled to the housing body 21 while bringing the blockage portion 23*a* close to the insertion port 20*a*3 in the fitting connection direction of the fitting portion (second cylindrical portion 20*b*).

The connector 1 includes a seal member 42 that fills a gap between the first cylindrical portion 20*a* and the blockage portion 23*a* to achieve waterproof and dustproof therebetween (FIGS. 4 and 5). The seal member 42 is made of an elastic member such as synthetic rubber. The seal member 42 includes a first seal portion 42*a* that is brought into close contact with an inner peripheral surface of an end portion of the first cylindrical portion 20*a* on the insertion port 20*a*3 side and is brought into close contact with a wall surface of an outer peripheral edge of the blockage portion 23*a* on the terminal containment chamber 20*c* side to achieve waterproof and dustproof at the insertion port 20*a*3 of the first cylindrical portion 20*a*. Further, the seal member 42 has a second seal portion 42*b* that blocks the notch 20*a*2 of the first cylindrical portion 20*a* while the electric wire We is inserted in a close contact state for each electric wire We to achieve waterproof and dustproofing in the notch 20*a*2. The seal member 42 is assembled to the first cylindrical portion 20*a* together with the terminal-equipped electric wire Wt.

The cover member 23 is held by the housing body 21 at an assembly completion position. For example, the housing body 21 and the cover member 23 are held between each other by a plurality of lock mechanisms 52 using claw portions or the like that hook each other (FIGS. 2, 4 and 5). The lock mechanism 52 includes a claw-like first locking portion 52*a* and a second locking portion 52*b* that is locked to the first locking portion 52*a* to hold the housing body 21 and the cover member 23 at the assembly completion position. Here, the lock mechanisms 52 each configured by the first locking portion 52*a* provided on the housing body 21 and the second locking portion 52*b* provided on the cover member 23 are provided at a plurality of locations on the first cylindrical portion 20*a* side, and the lock mechanisms 52 each configured by the first locking portion 52*a* provided on the cover member 23 and the second locking portion 52*b* provided on the housing body 21 are provided at a plurality of locations on the first holding portion 61 side.

Further, the cover member 23 includes a second holding portion 62 that serves as one end of the electric wire holding portion 60 together with the first holding portion 61 (FIGS. 2 to 5, 7 and 8).

The electric wire holding portion 60 is formed by coupling the first holding portion 61 of the housing body 21 and the second holding portion 62 of the cover member 23 at the assembly completion position of the housing body 21 and the cover member 23. The first holding portion 61 and the second holding portion 62 are assembled to each other in the same direction as the assembling direction of the housing body 21 and the cover member 23.

The electric wire holding portion 60 is a path for each electric wire We that inserts and holds the electric wire We in the axial direction thereof over the inside and outside of the housing 20, and has an electric wire insertion path 63 formed by a first groove 63*a* and a second groove 63*b* joined in the assembling direction of the first holding portion 61 and the second holding portion 62 orthogonal to the axial direction (FIGS. 3 to 8). The electric wire holding portion 60 illustrated here has three electric wire insertion paths 63 that are located in parallel.

The two adjacent electric wire insertion paths 63 are offset from each other in a direction orthogonal to the axial direction of the electric wire We in the path and an assembling direction of the first holding portion 61 and the second holding portion 62, and are offset from each other in the assembling direction. The electric wire holding portion 60 illustrated here includes, as the electric wire insertion path 63, a first electric wire insertion path 63A and a second electric wire insertion path 63B arranged at intervals in a direction orthogonal to the axial direction and the assembling direction, and includes a third electric wire insertion path 63C offset in the assembling direction from between the first electric wire insertion path 63A and the second electric wire insertion path 63B (FIGS. 3 and 8).

Figure 8:
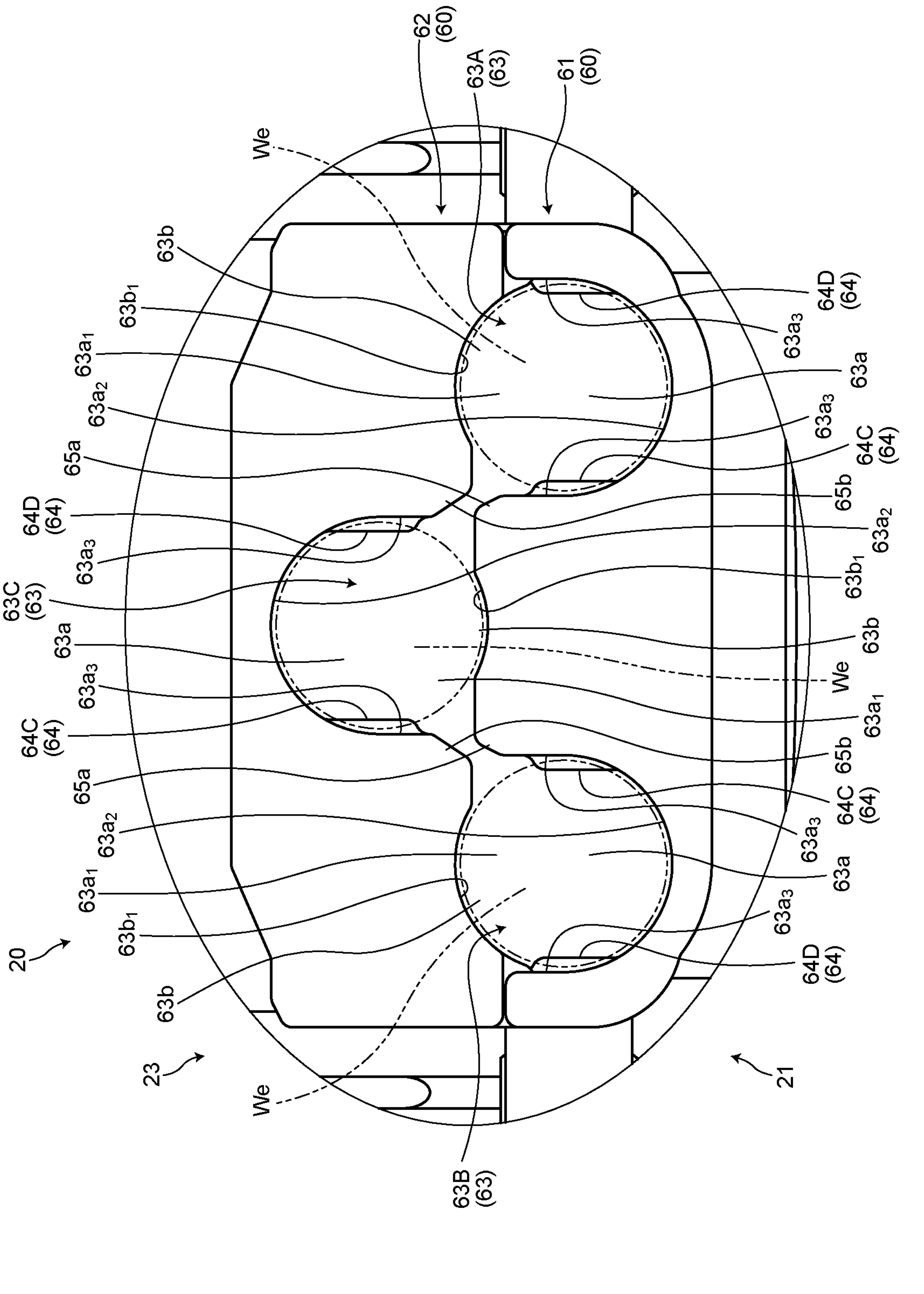
FIG. 8 is a plan view of the electric wire holding portion as viewed from an electric wire outlet side.

A first groove 63*a* is formed as an electric wire accommodation groove that accommodates the electric wire We from an electric wire insertion port 63*a*1 opened in the assembling direction of the first holding portion 61 and the second holding portion 62 (FIG. 8). Then, a second groove 63*b* is formed as a cover groove having a smaller volume than the first groove 63*a* and covering the electric wire insertion port 63*a*1 (FIG. 8). Therefore, in the electric wire insertion path 63, an electric wire insertion port 63*a*1 of the first groove 63*a* in which the electric wire We is accommodated is covered with the second groove 63*b*.

Figure 6:
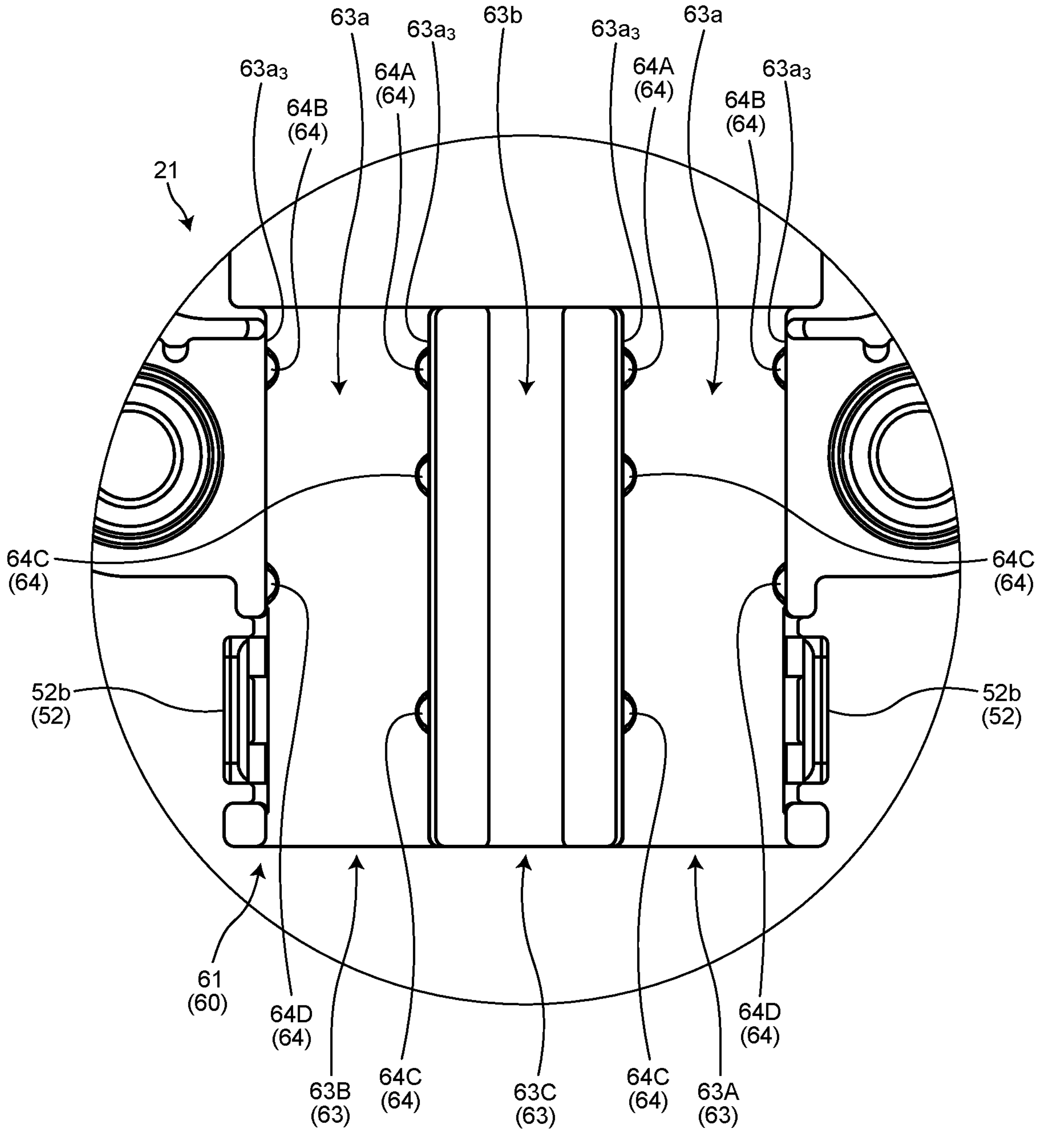
FIG. 6 is a plan view of a first holding portion as viewed from inside.
Figure 7:
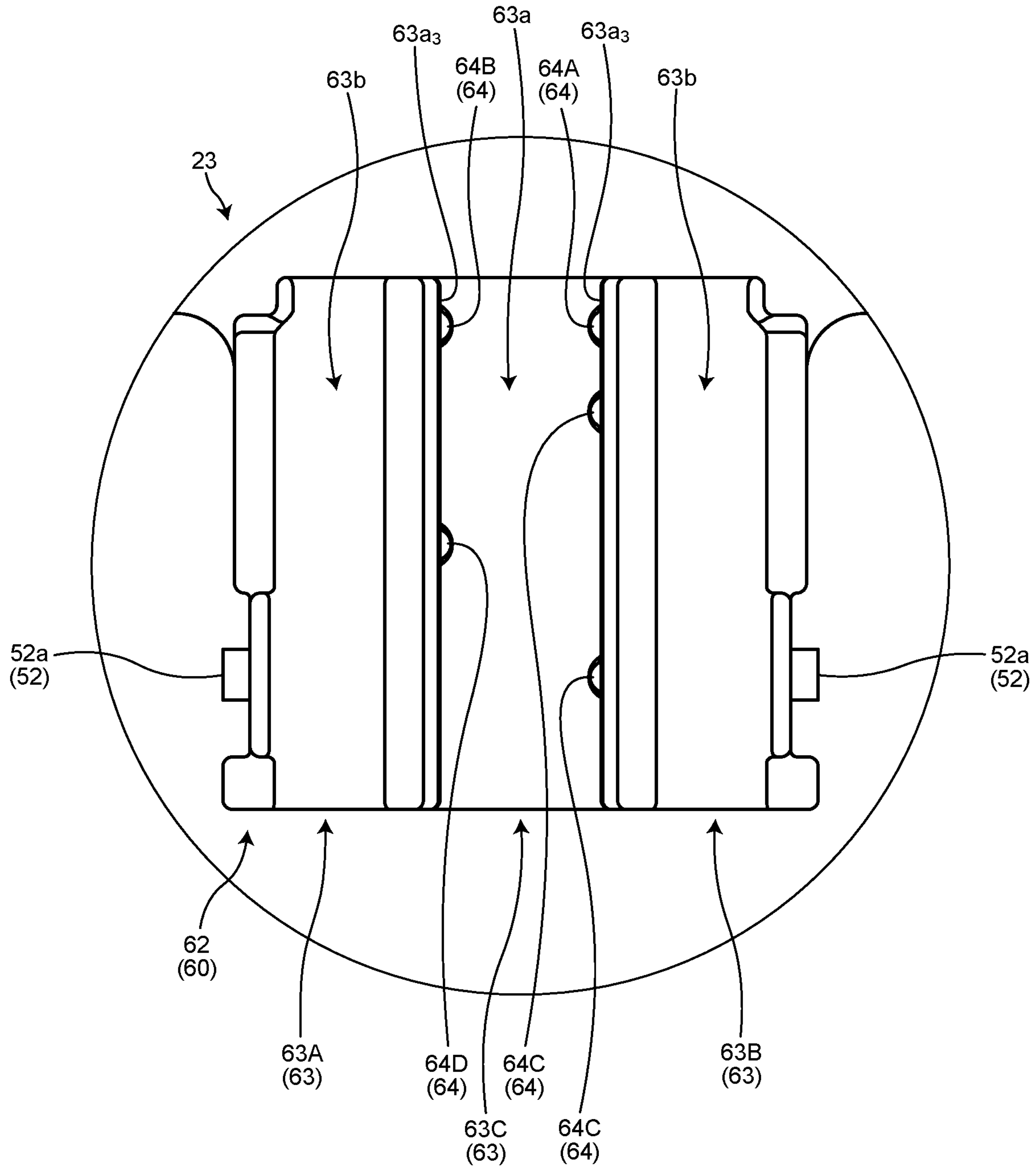
FIG. 7 is a plan view of a second holding portion as viewed from inside.

The first groove 63*a* illustrated here includes a groove bottom wall 63*a*2 having a semicircular arcuate bottom surface having a larger diameter than an outer diameter of the electric wire We and arranged to face the electric wire insertion port 63*a*1 at an interval, and groove side walls 63*a*3 and 63*a*3 which are vertically provided in the same direction from both ends of the groove bottom wall 63*a*2 and have the electric wire insertion port 63*a*1 between both ends in the vertical direction (FIGS. 6 to 8). Therefore, in the first groove 63*a*, an interval between the groove side walls 63*a*3 and 63*a*3 is wider than an outer diameter of the electric wire We. In addition, the second groove 63*b* illustrated here is formed by an arc-shaped groove wall 63*b*1 having a narrow central angle (FIG. 8).

In the electric wire insertion path 63, the electric wire We is held in the first groove 63*a*. Therefore, the first groove 63*a* has a protrusion 64 that protrudes from each of the groove side walls 63*a*3 and 63*a*3 and sandwiches the electric wire We between the groove side walls 63*a*3 and 63*a*3 (FIGS. 6 to 8). The protrusion 64 extends between a groove bottom wall 63*a*2 side of the first groove 63*a* and the electric wire insertion port 63*a*1 side across a maximum outer diameter portion of the electric wire We. In the first groove 63*a*, the protrusion 64 is caused to protrude from each of the groove side walls 63*a*3 and 63*a*3 to a position where an interval between the protrusions 64 of the respective groove side walls 63*a*3 and 63*a*3 is narrower than an outer diameter of the electric wire We as viewed in the axial direction of the accommodated electric wire We. The protrusion 64 illustrated here is formed in a rib shape extending from each end portion of the groove bottom wall 63*a*2 to an end portion of each of the groove side walls 63*a*3 and 63*a*3 on the electric wire insertion port 63*a*1 side across the maximum outer diameter portion of the electric wire We.

A plurality of the protrusions 64 are provided at intervals in the axial direction of the electric wire We for each of the groove side walls 63*a*3 and 63*a*3. In the first groove 63*a* illustrated here, as the protrusion 64, a first protrusion 64A of one groove side wall 63*a*3 and a second protrusion 64B of the other groove side wall 63*a*3 arranged facing each other in a facing arrangement direction of the groove side walls 63*a*3 and 63*a*3 are provided (FIGS. 6 and 7). Further, the first groove 63*a* illustrated here is provided with, as the protrusion 64, two third protrusion portions 64C protruding from one groove sidewall 63*a*3 at intervals in the axial direction of the electric wire We, and a fourth protrusion portion 64D protruding from the other groove sidewall 63*a*3 toward between the two third protrusion portions 64C (FIGS. 6 and 7).

In the electric wire holding portion 60, the electric wire insertion path 63 is roughly classified into a path formed by the first groove 63*a* provided in one of the first holding portion 61 and the second holding portion 62 and the second groove 63*b* provided in the other thereof, and a path formed by the first groove 63*a* provided in the other of the first holding portion 61 and the second holding portion 62 and the second groove 63*b* provided in one of the first holding portion 61 and the second holding portion 62. For example, one of the first holding portion 61 and the second holding portion 62 has the first groove 63*a* of the first electric wire insertion path 63A, the first groove 63*a* of the second electric wire insertion path 63B, and the second groove 63*b* of the third electric wire insertion path 63C. The other of the first holding portion 61 and the second holding portion 62 has the second groove 63*b* of the first electric wire insertion path 63A, the second groove 63*b* of the second electric wire insertion path 63B, and the first groove 63*a* of the third electric wire insertion path 63C. Here, the first groove 63*a* of the first electric wire insertion path 63A, the first groove 63*a* of the second electric wire insertion path 63B, and the second groove 63*b* of the third electric wire insertion path 63C are provided in the first holding portion 61, and the second groove 63*b* of the first electric wire insertion path 63A, the second groove 63*b* of the second electric wire insertion path 63B, and the first groove 63*a* of the third electric wire insertion path 63C are provided in the second holding portion 62 (FIG. 8).

As described above, in the electric wire holding portion 60, the two adjacent electric wire insertion paths 63 are offset from each other in a direction orthogonal to the axial direction of the electric wire We in the path and an assembling direction of the first holding portion 61 and the second holding portion 62, and are offset from each other in the assembling direction. Therefore, the size of the electric wire holding portion 60 in the direction orthogonal to the axial direction and the assembling direction can be reduced. Furthermore, in each of the first holding portion 61 and the second holding portion 62, there is no need to provide a plate-like partition wall as in the conventional art between the first groove 63*a* in one electric wire insertion path 63 and the second groove 63*b* in the other electric wire insertion path 63 in the two adjacent electric wire insertion paths 63. Therefore, in the electric wire holding portion 60, since an interval between the two adjacent electric wire insertion paths 63 can be narrowed, the size in the direction orthogonal to the axial direction of the electric wire We in the path and the assembling direction of the first holding portion 61 and the second holding portion 62 can be further reduced. Therefore, in the housing 20, along with the downsizing of the electric wire holding portion 60 in the orthogonal direction, the terminal fittings 10 can be arranged close to each other in the orthogonal direction. Therefore, in the connector 1, the housing 20 can be downsized in the orthogonal direction.

Here, in the first holding portion 61, there is a boundary portion 65*a* connecting the groove sidewall 63*a*3 of the first groove 63*a* and the groove wall 63*b*1 of the second groove 63*b* between the first groove 63*a* and the second groove 63*b* adjacent to each other (FIG. 8). In the second holding portion 62, there is a boundary portion 65*b* connecting the groove sidewall 63*a*3 of the first groove 63*a* and the groove wall 63*b*1 of the second groove 63*b* between the first groove 63*a* and the second groove 63*b* adjacent to each other (FIG. 8). Therefore, in the electric wire holding portion 60, the boundary portion 65*a* of the first holding portion 61 and the boundary portion 65*b* of the second holding portion 62 are positioned between the two adjacent electric wire insertion paths 63 at the assembly completion position of the first holding portion 61 and the second holding portion 62. Therefore, the first holding portion 61 and the second holding portion 62 are formed so as to form a gap at an assembly completion position between the boundary portion 65*a* and the boundary portion 65*b* between the two adjacent electric wire insertion paths 63 in order to avoid an unassemblable state due to tolerance variation (FIG. 8).

In addition, the housing 20 of the present embodiment includes a front holder 24 (FIGS. 1 to 5) fitted into an opening 20*b*2 of the fitting portion (second cylindrical portion 20*b*). The front holder 24 is made of an insulating material such as synthetic resin. The front holder 24 is fitted into an opening 20*b*2 of the fitting portion (second cylindrical portion 20*b*) while exposing the terminal containment portion 22*a* in which the terminal connection portion 11 is accommodated (FIG. 1).

The front holder 24 is held by the housing body 21 at the assembly completion position. For example, the housing body 21 and the front holder 24 are held between each other by a plurality of lock mechanisms 53 using claw portions or the like that hook each other (FIGS. 4 and 5). The lock mechanism 53 includes a claw-like first locking portion 53*a* and a second locking portion 53*b* that is locked to the first locking portion 53*a* to hold the housing body 21 and the front holder 24 at the assembly completion position. Here, the first locking portion 53*a* is provided on the housing body 21, and the second locking portion 53*b* is provided on the front holder 24.

The shield shell 30 is provided to suppress intrusion of noise into the housing 20 and to release the noise carried on a shield material SH from the housing of the electric device to the vehicle body. Therefore, the shield shell 30 is made of a conductive material such as metal. The shield shell 30 has a containment chamber (hereinafter, referred to as "housing containment chamber") 30*a* that covers the housing 20 from the outside to contain the housing 20 (FIGS. 1 and 2). Further, the shield shell 30 physically and electrically connects the shield material SH, and physically and electrically connects the shield material SH to a housing as an object to be fixed.

The shield shell 30 includes a first shield shell member 31 and a second shield shell member 32 assembled to each other (FIGS. 1 and 2).

The housing containment chamber 30*a* is formed in the first shield shell member 31 (FIG. 2). The first shield shell member 31 includes a main wall body 31*a* that covers the housing 20 from a side opposite to the fitting portion (second cylindrical portion 20*b*), and a peripheral wall body 31*b* that is vertically provided from a peripheral edge of the main wall body 31*a* in the fitting connection direction of the fitting portion (second cylindrical portion 20*b*) and covers the housing 20 from the side (FIGS. 1 and 2). The first shield shell member 31 uses a space surrounded by the main wall body 31*a* and the peripheral wall body 31*b* as the housing containment chamber 30*a*.

In the peripheral wall body 31*b* shown here, the drawing direction side of the electric wire We is notched, and the electric wire holding portion 60 of the housing 20 protrudes outward from a notch 31*b*1 (FIG. 2).

The second shield shell member 32 includes a cylindrical portion 32*a* having a cylindrical shape that surrounds the electric wire holding portion 60 protruding outward from the notch 31*b*1 of the first shield shell member 31 from the outside, and a plate-like connection portion 32*b* that is interposed between the blockage portion 23*a* of the cover member 23 and the main wall body 31*a* of the first shield shell member 31 and physically and electrically connected to the main wall body 31*a* (FIG. 2).

The shield material SH is physically and electrically connected to an outer peripheral surface of the cylindrical portion 32*a* by covering an outer peripheral surface of the cylindrical portion 32*a* with an end portion of the shield material SH and further crimping an annular caulking member 33 covered from the outer side thereof (FIG. 2). The connection portion 32*b* has an elastic contact portion 32*c* that is elastically deformable (FIG. 2), and when the first shield shell member 31 and the second shield shell member 32 are at the assembly completion position, the elastic contact portion 32*c* is pressed against a wall surface of the main wall body 31*a* by a resilient force.

In the shield shell 30, two female screw portions 34A in which the fitting connection direction of the fitting portion (second cylindrical portion 20*b*) is the screw axis direction are formed in the first shield shell member 31, and the first shield shell member 31 and the second shield shell member 32 are screwed and fixed by screwing a male screw member 34B inserted into a through hole of each female screw portion 34A of a fixing portion 32*d* of the second shield shell member 32 into the female screw portion 34A (FIG. 2). In the shield shell 30 illustrated here, a fixing portion 21*a* of the housing body 21 is sandwiched between the fixing portion 32*d* and the female screw portion 34A, and the male screw member 34B inserted into the through-hole of each of the fixing portions 32*d* and 21*a* is screwed into the female screw portion 34A to fasten and fix the housing body 21 together (FIGS. 1 and 2).

The shield shell 30 is physically and electrically connected to the housing of the electric device by screwing and fixing the peripheral wall body 31*b* of the first shield shell member 31 to the housing of the electric device. For example, two female screw portions (not illustrated) are formed on an attachment surface of the housing, and the peripheral wall body 31*b* is screwed and fixed by a screw shaft orthogonal to the fitting connection direction of the fitting portion (second cylindrical portion 20*b*). In the peripheral wall body 31*b*, a through hole 35 for inserting a male screw member (not illustrated) to be screwed into the female screw portion is formed for each female screw portion (FIGS. 1 and 2).

As described above, in the connector 1 of the present embodiment, since the size of the housing 20 can be reduced in the direction orthogonal to the axial direction of the electric wire We in the electric wire insertion path 63 and the assembling direction of the first holding portion 61 and the second holding portion 62, the connector 1 is suitable for downsizing the entire size in the orthogonal direction.

Although not illustrated, all the electric wire insertion paths 63 may be formed of the first groove 63*a* provided in one of the first holding portion 61 and the second holding portion 62 and the second groove 63*b* provided in the other holding portion. That is, in the electric wire holding portion 60, the first grooves 63*a* of all the electric wire insertion paths 63 may be provided in one of the first holding portion 61 and the second holding portion 62, and the second grooves 63*b* of all the electric wire insertion paths 63 may be provided in the other holding portion. For example, in view of the above specific example, the first holding portion 61 is provided with the first grooves 63*a* of the first electric wire insertion path 63A, the second electric wire insertion path 63B, and the third electric wire insertion path 63C. The second holding portion 62 is provided with the second grooves 63*b* of the first electric wire insertion path 63A, the second electric wire insertion path 63B, and the third electric wire insertion path 63C.

Even in this case, as in the above example, in the electric wire holding portion 60, the two adjacent electric wire insertion paths 63 are offset from each other in a direction orthogonal to the axial direction of the electric wire We in the path and an assembling direction of the first holding portion 61 and the second holding portion 62, and are offset from each other in the assembling direction. Therefore, the size of the electric wire holding portion 60 in the direction orthogonal to the axial direction and the assembling direction can be reduced. Furthermore, in one of the first holding portion 61 and the second holding portion 62 in this case, there is no need to provide a plate-like partition wall as in the conventional art between the first groove 63*a* in one electric wire insertion path 63 and the first groove 63*a* in the other electric wire insertion path 63 in the two adjacent electric wire insertion paths 63. In the other of the first holding portion 61 and the second holding portion 62 in this case, there is no need to provide a plate-like partition wall as in the conventional art between the second groove 63*b* in one electric wire insertion path 63 and the second groove 63*b* in the other electric wire insertion path 63 in the two adjacent electric wire insertion paths 63. Therefore, in the electric wire holding portion 60, since an interval between the two adjacent electric wire insertion paths 63 can be narrowed, the size in the direction orthogonal to the axial direction of the electric wire We in the path and the assembling direction of the first holding portion 61 and the second holding portion 62 can be further reduced. Therefore, even in this case, the terminal fitting 10 can be packed and arranged in the housing 20 in the orthogonal direction along with the miniaturization of the electric wire holding portion 60 in the orthogonal direction. Therefore, in the connector 1, the housing 20 can be downsized in the orthogonal direction. Therefore, even if the first grooves 63*a* of all the electric wire insertion paths 63 are provided in one of the first holding portion 61 and the second holding portion 62 and the second grooves 63*b* of all the electric wire insertion paths 63 are provided in the other holding portion, the connector 1 of the present embodiment is suitable for downsizing the entire body in the orthogonal direction as in the above example.

In the connector according to the present embodiment, in the electric wire holding portion, two adjacent electric wire insertion paths are offset from each other in a direction orthogonal to an axial direction of the electric wire in the path and an assembling direction of the first holding portion and the second holding portion, and are offset from each other in the assembling direction. Therefore, the size of the electric wire holding portion in the direction orthogonal to the axial direction and the assembling direction can be reduced. Further, in each of the first holding portion and the second holding portion, there is no need to provide a plate-like partition wall as in the conventional art between a first groove in one electric wire insertion path and a second groove in the other electric wire insertion path in two adjacent electric wire insertion paths. Alternatively, in one of the first holding portion and the second holding portion, there is no need to provide a conventional plate-like partition wall between the first groove in one electric wire insertion path and the first groove in the other electric wire insertion path in the two adjacent electric wire insertion paths, and in the other of the first holding portion and the second holding portion, there is no need to provide a conventional plate-like partition wall between the second groove in one electric wire insertion path and the second groove in the other electric wire insertion path in the two adjacent electric wire insertion paths. Therefore, in the electric wire holding portion, since the interval between the two adjacent electric wire insertion paths can be narrowed, the size in the direction orthogonal to the axial direction of the electric wire in the path and the assembling direction of the first holding portion and the second holding portion can be further reduced. Therefore, in the housing, along with the downsizing of the electric wire holding portion in the orthogonal direction, the terminal fittings can be arranged close to each other in the orthogonal direction. Therefore, in this connector, the housing can be downsized in the orthogonal direction. Therefore, the connector according to the present invention is suitable for downsizing the entire body in the orthogonal direction.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A connector comprising:

a terminal fitting physically and electrically connected to a terminal of an electric wire to form a terminal-equipped electric wire; and a housing configured to accommodate a plurality of the terminal-equipped electric wires, hold two adjacent electric wires side by side in a direction orthogonal to an axial direction thereof by an electric wire holding portion, and draw out each of the electric wires from the electric wire holding portion while keeping an arrangement state thereof, wherein the housing includes a housing body that accommodates the terminal-equipped electric wire from an insertion port, and a cover member that is assembled to the housing body to block the insertion port, and forms the electric wire holding portion by coupling a first holding portion of the housing body and a second holding portion of the cover member at an assembly completion position of the housing body and the cover member, the electric wire holding portion includes an electric wire insertion path which is a path for each electric wire in which the electric wire is inserted and held in the axial direction over an inside and outside of the housing, and formed by a first groove and a second groove joined in an assembling direction of the first holding portion and the second holding portion orthogonal to the axial direction, the two adjacent electric wire insertion paths are offset from each other in a direction orthogonal to the axial direction and the assembling direction, and are offset from each other in the assembling direction, the first groove is formed as an electric wire accommodation groove that accommodates the electric wire from an electric wire insertion port opened in the assembling direction, the second groove has a smaller volume than that of the first groove and is formed as a cover groove that covers the electric wire insertion port, and each of the first grooves has a protrusion protruding from each groove side wall and sandwiching the electric wire between the groove side walls.

2. The connector according to claim 1, wherein the electric wire insertion path is roughly classified into a path formed by the first groove provided in one of the first holding portion and the second holding portion and the second groove provided in the other holding portion, and a path formed by the first groove provided in the other holding portion and the second groove provided in the one holding portion.

3. The connector according to claim 1, wherein the electric wire holding portion includes, as the electric wire insertion path, a first electric wire insertion path and a second electric wire insertion path arranged at an interval in a direction orthogonal to the axial direction and the assembling direction, and a third electric wire insertion path offset in the assembling direction from between the first electric wire insertion path and the second electric wire insertion path, one of the first holding portion and the second holding portion has the first groove of the first electric wire insertion path, the first groove of the second electric wire insertion path, and the second groove of the third electric wire insertion path, and the other of the first holding portion and the second holding portion includes the second groove of the first electric wire insertion path, the second groove of the second electric wire insertion path, and the first groove of the third electric wire insertion path.

4. The connector according to claim 2, wherein the electric wire holding portion includes, as the electric wire insertion path, a first electric wire insertion path and a second electric wire insertion path arranged at an interval in a direction orthogonal to the axial direction and the assembling direction, and a third electric wire insertion path offset in the assembling direction from between the first electric wire insertion path and the second electric wire insertion path, one of the first holding portion and the second holding portion has the first groove of the first electric wire insertion path, the first groove of the second electric wire insertion path, and the second groove of the third electric wire insertion path, and the other of the first holding portion and the second holding portion includes the second groove of the first electric wire insertion path, the second groove of the second electric wire insertion path, and the first groove of the third electric wire insertion path.

5. The connector according to claim 1, wherein the protrusion extends between a groove bottom wall side of the first groove and the electric wire insertion port side across a maximum outer diameter portion of the electric wire.

6. The connector according to claim 2, wherein the protrusion extends between a groove bottom wall side of the first groove and the electric wire insertion port side across a maximum outer diameter portion of the electric wire.

7. The connector according to claim 3, wherein the protrusion extends between a groove bottom wall side of the first groove and the electric wire insertion port side across a maximum outer diameter portion of the electric wire.

8. The connector according to claim 4, wherein the protrusion extends between a groove bottom wall side of the first groove and the electric wire insertion port side across a maximum outer diameter portion of the electric wire.

9. The connector according to claim 1, wherein a plurality of the protrusions are provided at intervals in the axial direction for each of the groove side walls.

10. The connector according to claim 2, wherein a plurality of the protrusions are provided at intervals in the axial direction for each of the groove side walls.

11. The connector according to claim 3, wherein a plurality of the protrusions are provided at intervals in the axial direction for each of the groove side walls.

12. The connector according to claim 4, wherein a plurality of the protrusions are provided at intervals in the axial direction for each of the groove side walls.

13. The connector according to claim 5, wherein a plurality of the protrusions are provided at intervals in the axial direction for each of the groove side walls.

14. The connector according to claim 6, wherein a plurality of the protrusions are provided at intervals in the axial direction for each of the groove side walls.

15. The connector according to claim 7, wherein a plurality of the protrusions are provided at intervals in the axial direction for each of the groove side walls.

16. The connector according to claim 8, wherein a plurality of the protrusions are provided at intervals in the axial direction for each of the groove side walls.

* * * * *